Dec. 18, 1945.  K. D. ASHLEY  2,391,116
METHOD OF PRODUCING GRANULAR ADSORBENT
Filed March 26, 1942
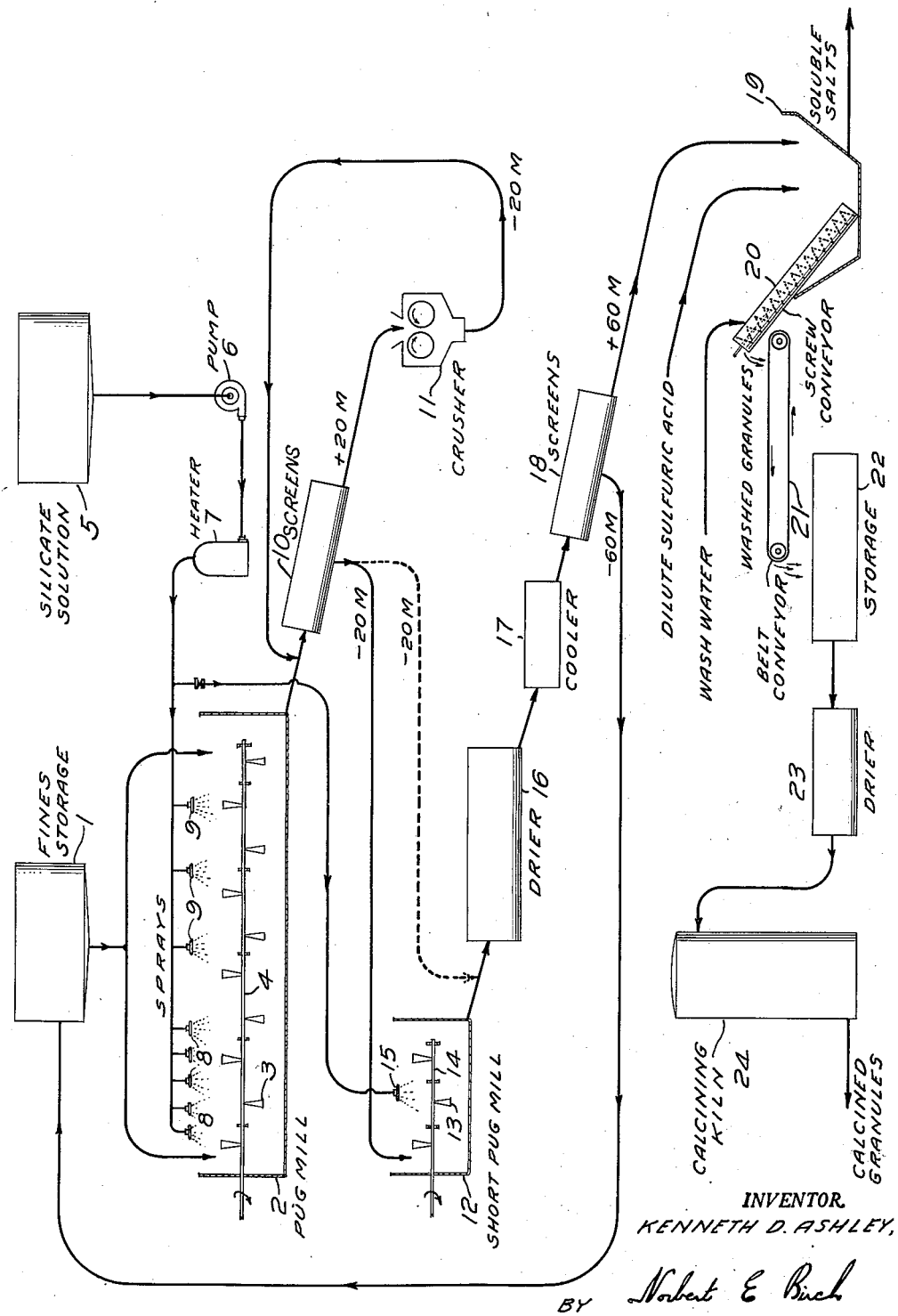
INVENTOR.
KENNETH D. ASHLEY,
BY Norbert E. Birch
ATTORNEY.

Patented Dec. 18, 1945

2,391,116

UNITED STATES PATENT OFFICE 2,391,116

METHOD OF PRODUCING GRANULAR ADSORBENT

Kenneth D. Ashley, Darien, Conn., assignor to American Cyanamid Company, New York, N. Y., a corporation of Maine Application March 26, 1942, Serial No. 436,289

10 Claims. (Cl. 252—300)

The present invention relates to improvements in adsorbents, and more particularly to the production from bauxite fines of a granular adsorbent.

This application is a continuation-in-part of my copending application Serial Number 288,522, filed August 5, 1939, and entitled "Adsorbents."

A particular object of this invention is the production from bauxite fines of a granular adsorbent having a particle size such that it may be effectively employed in the percolation filtration of hydrocarbon oils, animal, vegetable and fish oils, petrolatum, waxes, sugar solutions, or other materials requiring decolorization or deodorization. The adsorbent materials prepared in accordance with this invention may also be utilized as catalysts or catalyst supporting agents in processes involving cracking, polymerization, hydrogenation, dehydrogenation, desulfurization, or reforming of hydrocarbon oils or gases; the dehydration of alcohols; and the purification of air in air-conditioning systems.

A further object of this invention is the production of a granular adsorbent having a decolorizing efficiency and a resistance to attrition or breakdown substantially equal or superior to that of natural, crushed bauxite of corresponding particle size now commercially available.

In the manufacture of natural, crushed bauxite of a particle size suitable for percolation filtration, for example, 20–60 mesh, there is produced a very considerable proportion of fines which are of no utility so far as percolation filtration is concerned, due to the fineness or state of subdivision of the particles. For example, in the manufacture of 20–60 mesh natural, crushed bauxite there are produced fines having a substantial percentage of particles of 100–300 mesh size. In order to utilize the bauxite fines from this and other sources, the granulating process of the present invention was devised primarily to produce a highly efficient adsorbent of a particle size suitable for percolation filtration. It is to be understood, however, that the present invention is not limited solely to adsorbents for percolation filtration, since it is equally well adapted to the production of larger size granules suitable for use in catalytic or other processes.

The process of the present invention comprises essentially admixing bauxite fines with an aqueous solution of sodium silicate in such a manner and for such a period of time as to cause agglomeration or binding of the fines into granular particles predominantly of the desired size, drying the particles, washing the dried particles with a dilute mineral acid, such as sulfuric acid, and thereafter washing the particles with water to remove excess acid or soluble salts. The granular particles may then be treated for the removal of water and thereafter subjected to calcination, for example, at temperatures within the range of from about 400° F. to about 1600° F.

My invention may be further illustrated with reference to the accompanying drawing which represents diagrammatically the course of flow of the various materials employed in accordance with my process.

Bauxite fines, containing a substantial proportion of particles of 100–300 mesh or smaller are supplied from storage vessel 1 to the left-hand end of pug mill 2 provided with paddles 3 mounted on shaft 4, and aqueous sodium silicate solution from storage vessel 5 is passed by pump 6 through the heating device 7, wherein the solution may be brought to a temperature of, for example, 140° F., and thereafter sprayed from nozzles 8 and 9 upon the fines in the pug mill 2. The sodium silicate employed (dry basis) may range from 5 per cent to 12 per cent by weight of the fines to be treated, and is preferably of the order of 9 per cent to 11 per cent by weight. The ratio of $Na_2O:SiO_2$ in the silicate may vary from 1:1 to 1:4. Commercially available silicate solutions, such as "N" brand silicate having a ratio $Na_2O.3.22SiO_2$ and a Baumé gravity of 41° may be employed. The ratio of $Na_2O:SiO_2$ in this or other commercial silicate solutions may be varied by the addition of suitable amounts of NaOH. The quantity of water used in making up the sodium silicate solution, or in other words, the concentration of the sodium silicate solution utilized for binding the bauxite fines will vary, depending largely upon the volatile matter content of the fines and the particle size of such fines. Only sufficient water is used in the silicate solution to cause the fines, upon proper mixing to form into non-coalescent moist granules. For example, in granulating 100 parts by weight of bauxite fines having a volatile matter content of 30 per cent by weight, using 11 per cent by weight of sodium silicate (dry basis), the amount of water required was 23.15 parts by weight. The proper amount and concentration of sodium silicate solution were obtained by adding to 29 parts by weight of "N" brand sodium silicate (62.4 per cent water—37.6 per cent sodium silicate) an additional 5 parts by weight of water. In granulating 100 parts by weight of fines having a volatile matter content of 8 per cent by weight, using 5 per cent by weight of sodium silicate (dry basis), the amount of water required was 44.28 parts by weight. The proper amount and concentration of sodium silicate solution were obtained by adding to 13.1 parts by weight of "N" brand silicate solution an additional 36.1 parts by weight of water. In granulating 100 parts by weight of fines having a volatile matter content of 8 per cent by weight, using 12 per cent by weight of sodium silicate (dry basis), the amount of water required was 44.6 parts by weight. The proper amount and concentration of sodium silicate solution were obtained by adding to 31.4 parts by weight of "N" brand sodium silicate solution, an additional 25 parts by weight of water. In granulating 100 parts by weight of fines having a volatile matter content of 2 per cent by weight, using 5 per cent by weight of sodium silicate (dry basis), the amount of water required was 45.3 parts by weight. The proper amount and concentration of sodium silicate were obtained by adding to 13.4 parts by weight of "N" brand sodium silicate solution, an additional 3.7 parts by weight of water. In granulating 100 parts by weight of fines having a volatile matter content of 2 per cent by weight, using 12.2 per cent by weight of sodium silicate (dry basis), the amount of water required was 44.0 parts by weight. The proper amount and concentration of sodium silicate were obtained by adding to 32.4 parts by weight of "N" brand sodium slicate solution, an additional 23.6 parts by weight of water. Thus, with commercially available bauxite fines containing between 2 per cent and 30 per cent volatile matter content, using from 5 per cent to 12 per cent by weight of sodium silicate (dry basis), the total amount of water to be employed, exclusive of the water or volatile matter content of the bauxite, will generally fall between the limits of 44 per cent and 23 per cent by weight of the bauxite.

In the granulating operation, the rate of charge of the fines and the silicate solution to the pug mill 2, as well as the speed or time and manner of mixing, is so adjusted as to produce a maximum proportion of granular particles of the desired size, for example 20-60 mesh, without producing an excessive amount of oversize particles. In this granulating or agglomerating operation, 85 per cent, for example, of the silicate solution may be supplied to the fines through high capacity spray nozzles 8 during the initial stage of mixing and about 12 per cent to 15 per cent of the solution may be supplied through low capacity spray nozzles 9 during a later stage of the mixing. The fines, in passing through the pug mill are intimately admixed with silicate solution and are caused to form into non-coalescent moist agglomerates or granules which are preferably dried to some extent by introducing into the pug mill, adjacent the discharge outlet, a small amount, for example, about 4 per cent by weight, of dry fines. In general, the time required for mixing and agglomeration of the fines in the pug mill is generally not more than one hour, and is usually of the order of from about 10 to about 50 minutes. The material discharged from the pug mill 2 comprising a preponderating amount of granular particles of the desired size, such as 20-60 mesh, and a small amount of oversize particles as well as fines, is passed to a screening device 10 wherein the oversize, i. e., larger than 20 mesh (+20M) particles are separated from the material substantially 20 mesh (—20M) and smaller. The oversize material may be reduced to 20 mesh (—20M) or smaller by subjecting same to breakdown in the crushing rolls 11, the rolls of which may be set with a clearance of, for example, 0.05 inch. The material thus reduced may be recirculated to the screening device 10 wherein it is combined with the incoming granular particles from the pug mill 2, all of the 20 mesh (—20M) and smaller particles thus being separated for further treatment.

The 20 mesh (—20M) and smaller particles from screening device 10 may be introduced into a short pug mill 12 provided with paddles 13 mounted on shaft 14, and admixed therein with a small additional quantity, for example, 3 per cent, of sodium silicate solution introduced through spray nozzle 15. This second milling operation is designed to agglomerate into particles of desired size, i. e., 20-60 mesh, residual fines or small particles resulting from the screening or reducing operations above described. The time required for mixing in this short pug mill is generally of the order of from about 1 to about 5 minutes. While this second mixing operation is preferred, it may be dispensed with, particularly when the material from the screening device 10 does not contain substantial amounts of undesirably small particles or fines. The granular material discharged from the second pug mill 12, or from the screening device 10 (shown by the dotted line), as the case may be, is passed through drier 16, such as a rotary kiln drier operating at temperatures of from about 220° F. to about 1200° F., wherein the granular particles are dried to an extent sufficient to render them resistant to subsequent attrition or breakdown. In this drying operation the moisture content of the particles is reduced preferably to the order of 8 per cent– 10 per cent by weight, which is sufficiently low to give the particles the proper "set" or hardness.

The heated particles from the drier 16 are preferably cooled by passage through a suitable cooling device 17 and thereafter passed to the screening device 18 in which particles smaller than the desired size, i. e., 60 mesh (—60M), are separated and may be returned to the fines storage vessel 1. The material retained on the screens, predominantly of the desired particle size, i. e., 20-60 mesh (+60M), is then passed into acid washing vessel 19, wherein the particles are washed with a dilute mineral acid, such as sulfuric or hydrochloric acid (about 4 per cent to 20 per cent concentration) in order to neutralize at least a portion, and preferably all, of the alkaline content of the particles resulting from the silicate treatment. If desired, an excess of acid over that required to effect complete neutralization of the alkali may be employed, although in some cases the quantity of acid employed may be less than is required for complete neutralization of the alkali.

The acid washed particles are withdrawn from the bottom of washing vessel 19 by means of screw conveyor 20, and during their passage upwardly through the conveyor are subjected to washing with water introduced into the upper section of the conveyor. The soluble salts or excess acid from the acid washing are thus washed from the particles and pass downwardly into the acid washing vessel 19, from the bottom of which the solution of salts or spent acid may be withdrawn. The water-washed particles are then passed from the screw conveyor 20 onto a belt conveyor 21 which carries the washed particles or granules to storage vessel 22. The granules, if desired, may be passed from storage to a drying device 23 wherein the moisture content of the particles may be reduced, for example, to 30 per cent to 32 per cent, prior to calcining in the kiln 24 at temperatures of the order of from about 400° F. to about 1600° F.

While my invention has been described above with reference to the production of 20–60 mesh granules from bauxite fines, it is to be understood that my process is equally well adapted to the production of adsorbent granules of other desired mesh or size, for example, 20–80 mesh, 30–60 mesh, 15–30 mesh, and larger, depending upon the use to which such adsorbent is to be put.

The granular adsorbent produced in accordance with my invention has been found to have a decolorizing efficiency for hydrocarbon oils at least equal to, and in most instances greater than that of natural, crushed bauxite of approximately the same particle size. Furthermore, the decolorizing efficiency of my granular adsorbent does not decrease to substantial extent upon repeated use and revivification, and has a substantially greater resistance of attrition or breakdown during use and handling than natural, crushed bauxite of approximately the same particle size.

I claim:

1. The method of producing a granular adsorbent from bauxite fines, which comprises intimately admixing the fines with an aqueous solution containing 5 per cent to 12 per cent by weight of sodium silicate based on the fines and of such concentration as to wet and agglomerate the fines, continuing the mixing for a sufficient period to agglomerate the fines into non-coalescent granular particles, drying the particles so formed, washing the dried particles with dilute mineral acid, and washing the treated particles with water to remove therefrom soluble salts.

2. The method of producing a granular adsorbent from bauxite fines, which comprises intimately admixing the fines with an aqueous solution containing 5 per cent to 12 per cent by weight of sodium silicate based on the fines and of such concentration as to wet and agglomerate the fines, continuing the mixing for a sufficient period to agglomerate the fines into non-coalescent granular particles, drying the particles so formed, washing the dried particles with dilute mineral acid, washing the treated particles with water to remove therefrom soluble salts, removing water from the washed particles, and subjecting the particles to calcination.

3. The method of producing a granular adsorbent from bauxite fines, which comprises intimately admixing the fines with an aqueous solution containing 5 per cent to 12 per cent by weight of sodium silicate based on the fines and of such concentration as to wet and agglomerate the fines, continuing the mixing for a sufficient period to agglomerate the fines into non-coalescent granular particles predominantly of desired size, separating from the granular material oversize particles, reducing the oversize particles to particles predominantly of desired size, combining and drying the particles predominantly of desired size resulting from the aforesaid separating and reducing steps, washing the dried particles with dilute mineral acid, and washing the treated particles with water to remove therefrom soluble salts.

4. The method of producing a granular adsorbent from bauxite fines, which comprises intimately admixing the fines with an aqueous solution containing 5 per cent to 12 per cent by weight of sodium silicate based on the fines and of such concentration as to wet and agglomerate the fines, continuing the mixing for a sufficient period to agglomerate the fines into non-coalescent granular particle predominantly of desired size, separating from the granular material oversize particles, reducing the oversize particles to particles predominantly of desired size, combining and drying the particles predominantly of desired size resulting from the aforesaid separating and reducing steps, washing the dried particles with dilute mineral acid, washing the treated particles with water to remove therefrom soluble salts, removing water from the washed particles, and subjecting the particles to calcination.

5. The method of producing a granular adsorbent from bauxite fines, which comprises intimately admixing the fines with an aqueous solution containing 9 per cent to 11 per cent by weight of sodium silicate based on the fines and of such concentration as to wet and agglomerate the fines, continuing the mixing for a sufficient period to agglomerate the fines into non-coalescent granular particles, drying the particles so formed, washing the dried particles with dilute sulfuric acid, and washing the treated particles with water to remove therefrom soluble salts.

6. The method of producing a granular adsorbent from bauxite fines, which comprises intimately admixing the fines with an aqueous solution containing 9 per cent to 11 per cent by weight of sodium silicate based on the fines and of such concentration as to wet and agglomerate the fines, continuing the mixing for a sufficient period to agglomerate the fines into non-coalescent granular particles, drying the particles so formed, washing the dried particles with dilute sulfuric acid, washing the treated particles with water to remove therefrom soluble salts, removing water from the washed particles, and subjecting the particles to calcination.

7. The method of producing a granular adsorbent from bauxite fines, which comprises intimately admixing the fines with an aqueous solution containing 9 per cent to 11 per cent by weight of sodium silicate based on the fines and of such concentration as to wet and agglomerate the fines, continuing the mixing for a sufficient period to agglomerate the fines into non-coalescent granular particles predominantly of desired size, separating from the granular material oversize particles, reducing the oversize particles to particles predominantly of desired size, combining and drying the particles predominantly of desired size resulting from the aforesaid separating and reducing steps, washing the dried particles with dilute sulfuric acid, and washing the treated particles with water to remove therefrom soluble salts.

8. The method of producing a granular adsorbent from bauxite fines, which comprises intimately admixing the fines with an aqueous solution containing 9 per cent to 11 per cent by weight of sodium silicate based on the fines and of such concentration as to wet and agglomerate the fines, continuing the mixing for a sufficient period to agglomerate the fines into non-coalescent granular particles predominantly of desired size, separating from the granular material oversize particles, reducing the oversize particles to particles predominantly of desired size, combining and drying the particles predominantly of desired size resulting from the aforesaid separating and reducing steps, washing the dried particles with dilute sulfuric acid, washing the treated particles with water to remove therefrom soluble salts, removing water from the washed particles, and subjecting the particles to calcination.

9. The method of producing a granular adsorbent from bauxite fines, which comprises intimately admixing the fines with an aqueous solution containing 9 per cent to 11 per cent by weight of sodium silicate based on the fines and of such concentration as to wet and agglomerate the fines, continuing the mixing for a sufficient period to agglomerate the fines into non-coalescent granular particles predominantly of desired size, separating from the granular material oversize particles, reducing the oversize particles to particles predominantly of desired size, combining and drying the particles predominantly of desired size resulting from the aforesaid separating and reducing steps, separating from the dried material particles smaller than the desired size, washing the remaining dried particles with dilute sulfuric acid, and washing the treated particles with water to remove therefrom soluble salts.

10. The method of producing a granular adsorbent from bauxite fines, which comprises intimately admixing the fines with an aqueous solution containing 5 per cent to 12 per cent by weight of sodium silicate based on the fines and of such concentration as to wet and agglomerate the fines, continuing the mixing for a sufficient period to agglomerate the fines into non-coalescent granular particles, and drying the particles so formed.

KENNETH D. ASHLEY.